United States Patent
Classe et al.

(10) Patent No.: US 9,595,248 B1
(45) Date of Patent: Mar. 14, 2017

(54) REMOTELY OPERABLE BYPASS LOOP DEVICE AND SYSTEM

(71) Applicants: Doug Classe, Orlando, FL (US); Scott Jordan, Orlando, FL (US)

(72) Inventors: Doug Classe, Orlando, FL (US); Scott Jordan, Orlando, FL (US)

(*) Notice: Subject to any disclaimer, the term of this patent is extended or adjusted under 35 U.S.C. 154(b) by 0 days.

(21) Appl. No.: 14/938,266

(22) Filed: Nov. 11, 2015

(51) Int. Cl.
| | |
|---|---|
| *G10H 1/18* | (2006.01) |
| *G10H 1/00* | (2006.01) |
| *G10H 1/34* | (2006.01) |
| *H04R 3/00* | (2006.01) |
| *H04R 3/12* | (2006.01) |
| *G06F 3/16* | (2006.01) |

(52) U.S. Cl.
CPC .............. *G10H 1/18* (2013.01); *G06F 3/162* (2013.01); *G06F 3/165* (2013.01); *G10H 1/0008* (2013.01); *G10H 1/0058* (2013.01); *G10H 1/0066* (2013.01); *G10H 1/0091* (2013.01); *G10H 1/348* (2013.01); *H04R 3/00* (2013.01); *H04R 3/12* (2013.01); *G10H 2210/155* (2013.01); *G10H 2220/026* (2013.01); *G10H 2240/211* (2013.01)

(58) Field of Classification Search
CPC .. G10H 1/0091; G10H 1/0008; G10H 1/0058; G10H 1/348; H04R 3/00; H04R 3/12
USPC .............................................. 84/615; 381/61
See application file for complete search history.

(56) References Cited

U.S. PATENT DOCUMENTS

| | | | | | |
|---|---|---|---|---|---|
| 4,030,397 | A | * | 6/1977 | Nelson | G10H 1/0091 84/464 R |
| 4,270,226 | A | * | 5/1981 | Weintraub | H03J 9/00 381/2 |
| 4,366,346 | A | * | 12/1982 | Dijkmans | G10K 15/12 381/63 |
| 4,424,538 | A | * | 1/1984 | Greene | G11B 20/22 360/68 |
| 4,479,238 | A | * | 10/1984 | Spector | H03G 5/04 361/725 |
| 4,481,661 | A | * | 11/1984 | Spector | H03G 5/04 361/726 |
| 4,509,190 | A | * | 4/1985 | Spector | H04R 3/12 381/119 |
| 5,475,214 | A | * | 12/1995 | DeFranco | A63F 13/06 250/221 |
| 5,700,966 | A | * | 12/1997 | LaMarra | G10H 1/0066 84/645 |
| 5,705,950 | A | * | 1/1998 | Butler | H03F 1/327 330/100 |

(Continued)

*Primary Examiner* — David Warren
*Assistant Examiner* — Christina Schreiber
(74) *Attorney, Agent, or Firm* — Jason T. Daniel, Esq.; Daniel Law Offices, P.A.

(57) ABSTRACT

A remotely operable bypass loop device and system includes a bypass loop device having a wireless communication unit for communicating with a smartphone or other electronic device running a looper application. The bypass loop device includes an input for a musical instrument, an audio output, and a plurality of sound effect interfaces. Each of the sound effect interfaces communicate with an internal relay and control switch to form sound loops. The looper App generates a virtual representation of the bypass loop device, and functions to selectively engage and disengage sound loops based upon a user input to the App.

14 Claims, 5 Drawing Sheets

(56) References Cited

U.S. PATENT DOCUMENTS

| | | | | |
|---|---|---|---|---|
| 5,757,941 A * | 5/1998 | McMillen | H04H 60/04 | 381/119 |
| 6,215,055 B1 * | 4/2001 | Saravis | G10H 1/348 | 84/422.1 |
| 7,754,956 B2 * | 7/2010 | Gain | G10H 1/0091 | 84/610 |
| D637,645 S * | 5/2011 | Koursaris | D17/99 | |
| 8,426,716 B2 * | 4/2013 | Little | G10H 1/0008 | 84/609 |
| 8,609,973 B2 * | 12/2013 | D'Amours | G10H 1/0083 | 84/626 |
| 8,748,724 B1 * | 6/2014 | Harmon | G10H 1/02 | 84/737 |
| 8,802,961 B2 * | 8/2014 | Juszkiewicz | G10H 1/34 | 84/746 |
| 9,318,086 B1 * | 4/2016 | Miller | G10H 1/02 | |
| 2003/0196542 A1 * | 10/2003 | Harrison, Jr. | G04B 25/00 | 84/737 |
| 2004/0016338 A1 * | 1/2004 | Dobies | G10H 1/0091 | 84/662 |
| 2005/0056142 A1 * | 3/2005 | Mapleston | G10H 3/186 | 84/645 |
| 2005/0152558 A1 * | 7/2005 | Van Tassel | G10H 1/0091 | 381/61 |
| 2009/0129605 A1 * | 5/2009 | Camp, Jr. | G10H 1/0058 | 381/77 |
| 2010/0195840 A1 * | 8/2010 | Ciccone | G10H 1/0091 | 381/61 |
| 2010/0269670 A1 * | 10/2010 | O'Connor | G10H 1/0091 | 84/626 |
| 2012/0160079 A1 * | 6/2012 | Little | G10H 1/38 | 84/613 |
| 2013/0118340 A1 * | 5/2013 | D'Amours | G10H 1/0083 | 84/746 |
| 2013/0177176 A1 * | 7/2013 | Vumbaco | H04R 3/00 | 381/123 |
| 2013/0208954 A1 * | 8/2013 | Rowe | H04B 1/3827 | 382/119 |
| 2013/0275873 A1 * | 10/2013 | Shaw | G01S 3/8006 | 715/716 |
| 2013/0291708 A1 * | 11/2013 | Orshan | G10H 1/02 | 84/626 |
| 2013/0327201 A1 * | 12/2013 | Urry | G10H 1/06 | 84/626 |
| 2014/0126609 A1 * | 5/2014 | Vumbaco | G10H 1/34 | 375/130 |
| 2014/0140536 A1 * | 5/2014 | Serletic, II | G06F 3/0481 | 381/98 |
| 2014/0270214 A1 * | 9/2014 | Brandt | G10H 1/0091 | 381/61 |
| 2014/0270215 A1 * | 9/2014 | Lin | G10H 1/0091 | 381/61 |
| 2014/0270239 A1 * | 9/2014 | Vumbaco | H04R 3/00 | 381/81 |
| 2014/0270266 A1 * | 9/2014 | Vumbaco | H04R 3/00 | 381/123 |
| 2014/0270267 A1 * | 9/2014 | Cedro | H04R 3/00 | 381/123 |
| 2015/0161978 A1 * | 6/2015 | Packouz | G10H 1/40 | 84/746 |
| 2016/0019877 A1 * | 1/2016 | Remignanti | G10H 1/0066 | 84/645 |
| 2016/0093278 A1 * | 3/2016 | Esparza | G10H 3/146 | 84/615 |

* cited by examiner

FIG. 5

REMOTELY OPERABLE BYPASS LOOP DEVICE AND SYSTEM

TECHNICAL FIELD

The present invention relates generally to systems and devices for controlling special effects and distortions on audio signals, and more particularly to a bypass loop controller that can be remotely operated to selectively activate a plurality of audio loops.

BACKGROUND

The statements in this section merely provide background information related to the present disclosure and may not constitute prior art.

Musicians playing amplified guitars often utilize one or more small, electronic sound altering devices to change the natural sound of their instrument. These sound effect devices are commonly called effect pedals, and are typically designed to rest on the floor during use. This feature allows a musician to selectively activate each pedal using their foot, thereby leaving the user's hands free to play the instrument.

Guitar effect pedals were introduced in the late 1960's, and the prior art generally discusses that the effects able to be produced at this time are virtually unlimited. As such, skilled musicians will often utilize a plurality of different effect pedals when playing on stage or in a recording studio, for example.

In addition to the above, there are several known bypass loop systems (e.g., looper) which can be connected to multiple effect pedals in order to allow a musician to selectively control the operating status of the same via a single device. For example, a user can program the looper to activate a first group of effect pedals for one song, and to then activate a second group of effect pedals for a second song. Such a feature prevents the user from having to activate and deactivate each individual effect pedal between songs.

Owing to the analog switching components of traditional loop systems, it is necessary for the user to have physical access to the loop system in order to program the same. To this end, musicians will typically pre-program the loop systems to include a plurality of sound effect groups for each song they are about to play. Although this is fine when the musician only plays the anticipated songs in a particular order, a problem arises when the musician wants to spontaneously change the grouping. In such a situation, he or she must stop playing and physically program the loop system to include a new effect group, or have a sound engineer physically access the system to do the same.

Accordingly, it would be beneficial to provide a remotely operably bypass loop system that can be quickly and easily programmed via a wireless control system, and that does not suffer from the drawbacks of the devices described above.

SUMMARY OF THE INVENTION

The present invention is directed to a remotely operable bypass loop device and system. In one embodiment, the system can include a bypass loop device having a wireless communication unit that can communicate with a smartphone or other electronic device running a looper application. The bypass loop device can include an input for a musical instrument such as a guitar, for example, and an audio output to a speaker. A plurality of sound effect interfaces can be interposed along the audio path in order to impart effects to the same.

The bypass loop device can include a plurality of internal relays and control switches that are connected to each of the sound effect interfaces for selectively engaging and disengaging a connected sound effect device. The device can further include a memory and display unit for storing and retrieving pre-programmed sound loop settings, wherein selective sound effects are activated.

The looper App can include functionality for generating a virtual representation of the bypass loop device, and can receive instructions from a user to selectively engage and disengage particular sound loops. Upon receiving a change request on the App, the smartphone can instruct the bypass loop device to implement the requested change immediately.

In another embodiment, the smartphone App can access the internet and/or the smartphone memory and retrieve an unlimited number of pre-programmed sound loop configurations for transmission to the bypass loop device.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 2.

In the below described examples, programming code for implementing the remote programming of the bypass loop device can be presented in the form of a smartphone mobile application (i.e., App) which can be downloaded and installed as an application after purchase of the smartphone device. Of course, the inventive concepts disclosed herein are not to be construed as limiting to a smartphone App, as virtually any type of instruction sets, in any form of programming language that can be executed on a processor enabled device are also contemplated.

Although the preferred embodiment will include a smartphone device to run the looper App, the inventive concepts are not limited only to a smartphone, as any type of processor enabled device that is capable of providing two way communication with the bypass loop device can be utilized herein. Several nonlimiting additional examples include Bluetooth enabled phones and tablet computers, portable computers, PDAs, portable music devices (MP3 players), and/or wearable devices such as smartphone watches, for example. Accordingly, the device and/or method steps are not to be construed as limiting to any particular device for executing the below described application.

In either instance, a user's smartphone or tablet device generally includes installed software adapted to generate a bypass looper icon that is included with the bypass looper App 50, and to display same on the display screen of the smartphone device. The icon can be activated through use of a touch sensitive smartphone or tablet screen, and/or a keypad, for example. Selecting the looper icon launches the system application and/or launches a linked web page through internet connectivity wherein the below described presentation screens are generated. Selecting the looper icon also activates the devices wireless communication unit such as a Bluetooth transceiver, for example.

Figure 1:
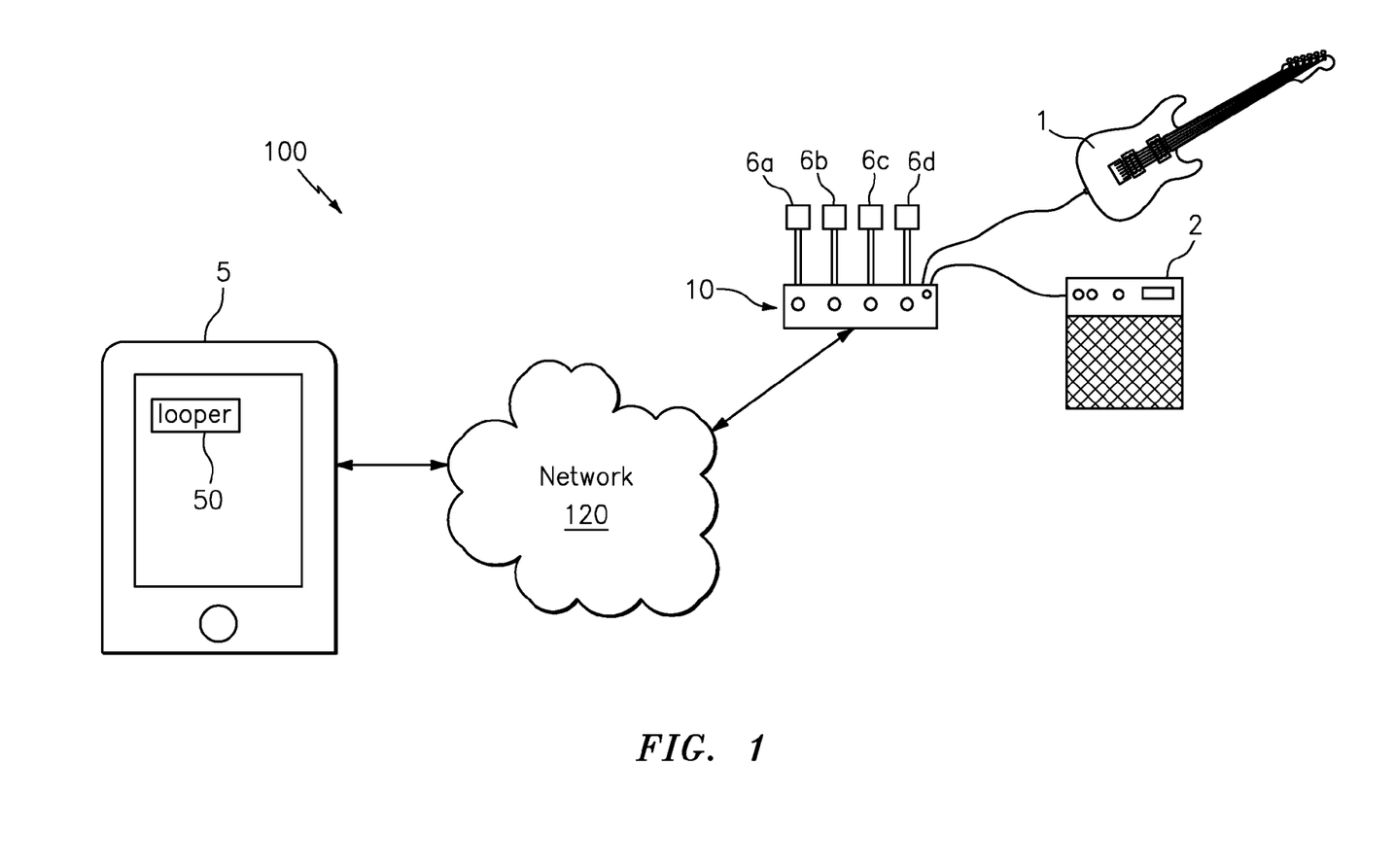
FIG. 1 is an exemplary system environment of the bypass loop system that is useful for understanding the inventive concepts disclosed herein.

FIG. 1 illustrates one embodiment of the remotely operable bypass loop system that is useful for understanding the inventive concepts disclosed herein. Although described for use with an electric guitar, this is for illustrative purposes only, as the inventive concepts disclosed herein can be utilized with any type of instrument, regardless of the manufacturer and/or intended use of the same.

As shown, the system 100, can function to allow a user to wirelessly 120 access and/or program a bypass loop device 10 via a smartphone 5 or other such device that is running a bypass looper application 50. As such, the system 100 can utilize the processing power, storage and communicative abilities of the smartphone to store an unlimited number of loop configurations, and to transmit the same to the loop device 10. Moreover, as will be described below, the App can allow a user to make instantaneous changes to the loop device 10 at any time without having to physically access the device.

As shown, the bypass loop device 10 can engage a plurality of commercially available sound effect devices 6a-6d and can allow a user to selectively alter the sound generated by a musical instrument 1 before it is amplified and/or sent to a speaker 2.

Although illustrated with respect to a single smartphone communicating with a single bypass loop device, other embodiments are also contemplated. For example, the system can also include multiple user devices having looper Apps communicating simultaneously with a single bypass looper device. Additionally, the system can include multiple bypass loop devices that are in communication with a single smartphone device running the looper App.

Figure 2:
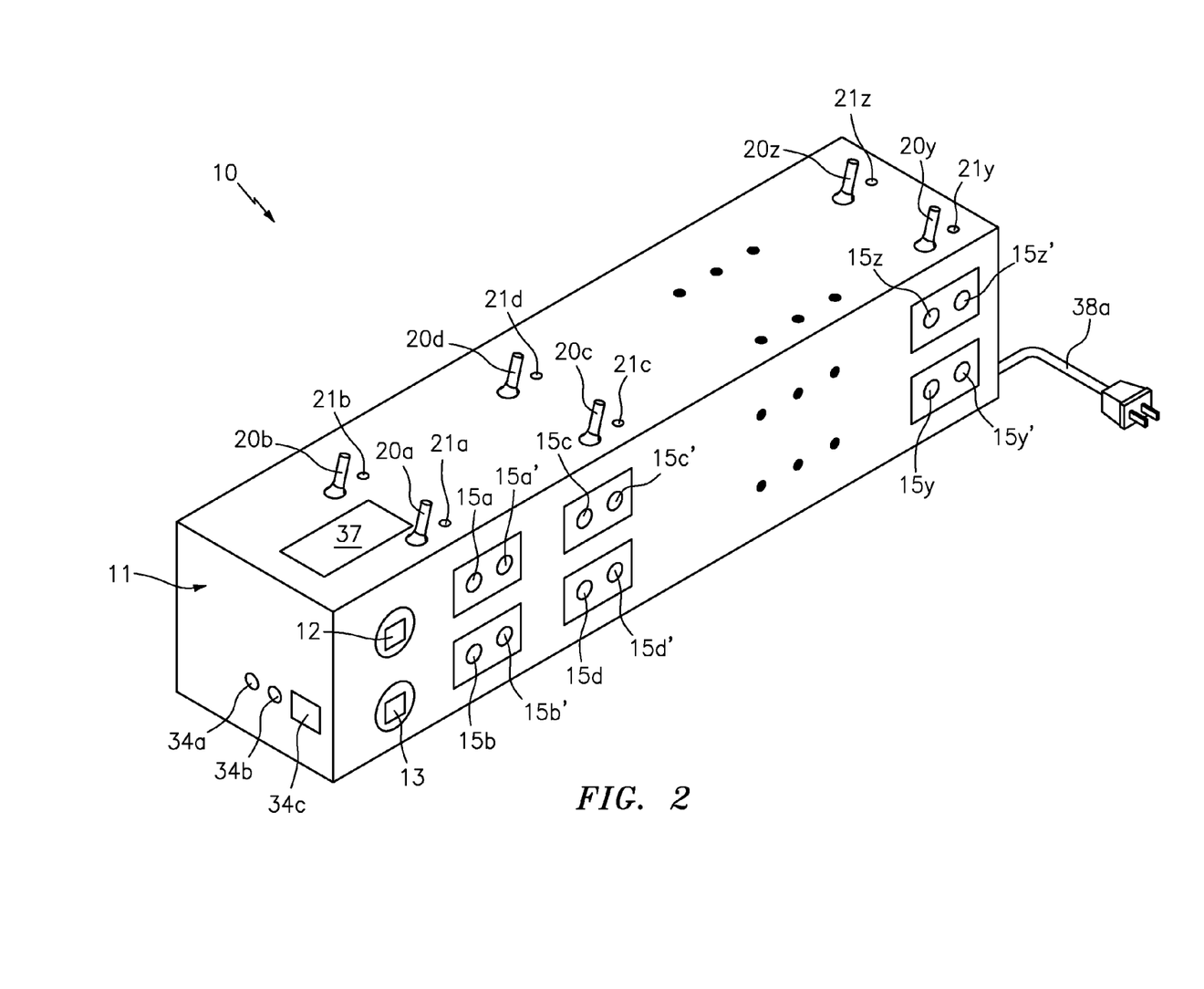
FIG. 2 is a perspective view of the bypass loop device, in accordance with one embodiment of the invention.
Figure 3:
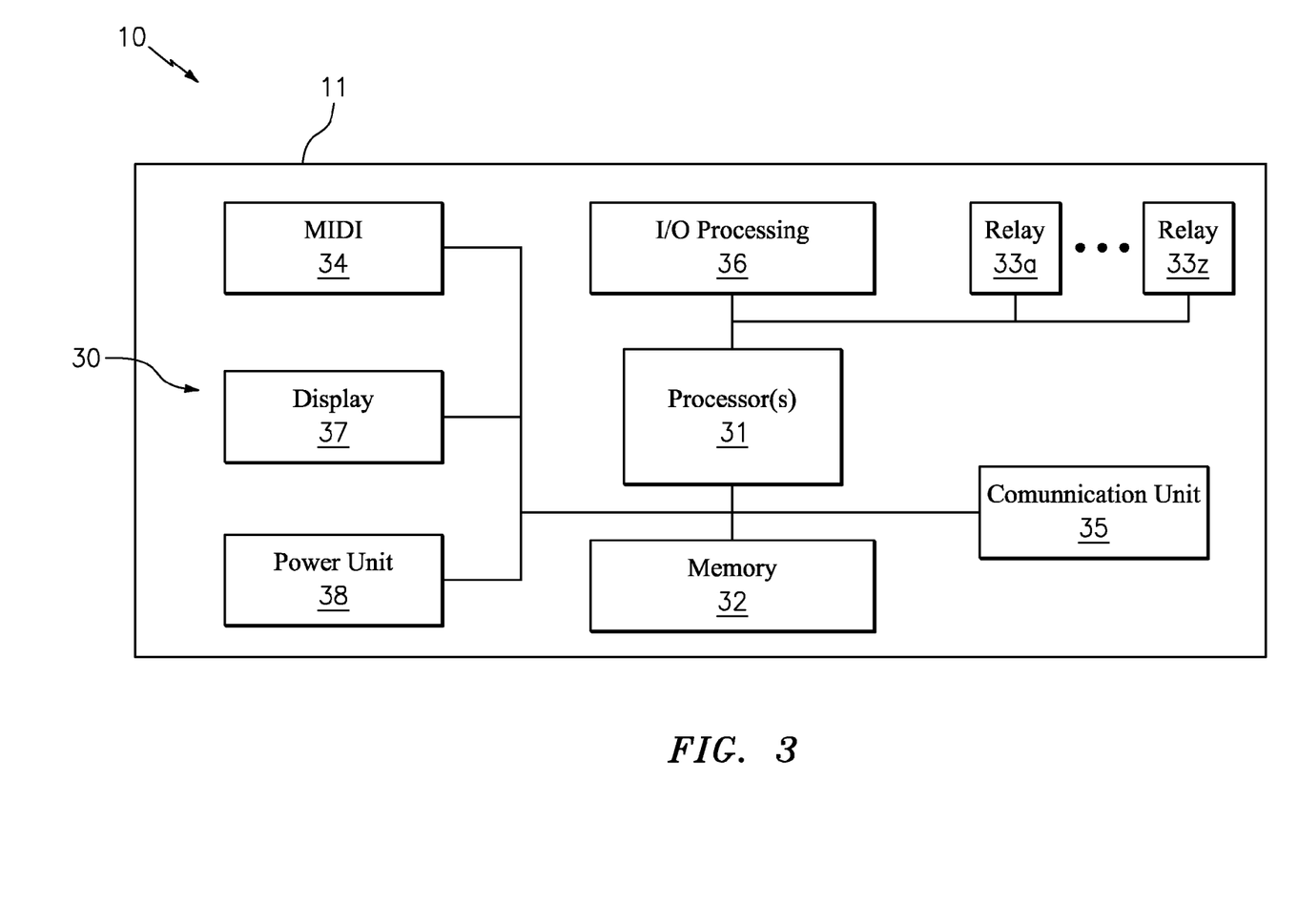
FIG. 3 is a simplistic block diagram of the controller of the bypass loop device, in accordance with one embodiment of the invention.

FIGS. 2 and 3 illustrate one embodiment of the bypass loop device 10 for use with the system 100. The device 10 can include a main body 11 that has an instrument jack 12, an audio output 13, a plurality of effect device connectors (referred to collectively at 15), a plurality of switches (referred to collectively at 20), a plurality of lights 21, and a control unit 30.

The main body 11 can include any number of different shapes and sizes that are suitable for housing the device components. In the preferred embodiment, the main body will be constructed from a sturdy material such as steel or aluminum, for example, however other construction materials such as plastics and the like are also contemplated.

Each individual input jack 15a-15z, can be tied to an individual output jack 15a'-15z' and an individual control switch 20a-20z, so as to allow a user to selectively engage and disengage a particular sound effect device 6a-6z via the associated control switch. To this end, each of the jacks can include any type and/or size receptacle for receiving an instrument cable having an associated plug for sending and/or receiving signals.

In the preferred embodiment, each of the switches 20a-20z can include conventional metallic push buttons that are arranged along the top surface of the main body so as to be operated by a user's foot. Likewise, each of the lights 21a-21z can preferably include a light emitting diode (LED), for example, that is disposed adjacent to a respective switch. As such, each light can include any number of different colors, and can function to flash, or remain illuminated, based on an instruction from the processor.

In operation, when a particular switch is pressed, the internal relay can transition between an open and a closed configuration, thereby alternatively allowing and preventing the sound effect from joining the audio stream. Moreover, each associated light can function to provide a visual notification to the user showing which effect(s) is active at any given time.

Although described or illustrated with respect to particular shapes, sizes construction materials and/or locations along the main body, this is for illustrative purposes only, as the device can be constructed with any number of different components having any number of different shapes, sizes and construction materials that can be located at any location along the main body without limitation. Additionally, the device is not limited to push button switches, as any number of other components capable of receiving user inputs and engaging the internal relays are also contemplated.

The controller 30 can function to control the operation of the bypass loop device 10, and can further function to communicate with the smartphone device 5 having the looper app 50 installed thereon. In this regard, FIG. 3 illustrates an exemplary block diagram of one embodiment of a suitable controller 30. As shown, the controller can include one or more processors 31 that are conventionally connected to a memory 32, a plurality of relays 33a-33z, a MIDI controller 34, a communication unit 35, an I/O processing unit 36, a display unit 37 and a power source 38.

Although illustrated as separate elements, those of skill in the art will recognize that one or more system components may be, or may include, one or more printed circuit boards (PCB), containing an integrated circuit or circuits for completing the activities described herein, and the CPU may be one or more integrated circuits having firmware for causing the circuitry to complete the activities described herein. Additionally, one or more of the controller elements may also be arranged as a completely separate element (such as the power source and/or relays, for example) that is/are communicatively linked to the processor.

The processor/CPU 31 can act to execute program code stored in the memory 32 in order to allow the device to perform the functionality described herein. Although illustrated as a single processor, this is for ease of illustration, as any number of individual sub processors can also be provided. In either instance, processors are extremely well known in the art, therefore no further description will be provided.

Memory 32 can act to store operating instructions in the form of program code for the processor(s) 31 to execute. Although illustrated as a single component, memory 32 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device. Additionally, memory 32 can also include one or more cache memories that provide temporary storage of at least some program code in order to reduce the number of times program code must be retrieved from the bulk storage device during execution. Each of these devices are well known in the art.

The controller can include a plurality of internally located relays 33a-33z that are each tied to an input jack, an output jack and a switch. To this end, relay 33a can engage input jack 15a, output jack 15a' and switch 20a, while relay 33z can engage input jack 15z, output jack 15z' and switch 20z, respectively. Each combination of relay, jack input, jack output and switch are referred to as a sound loop.

The controller can further include a MIDI module 34 which can function to allow the device to communicate with a wide variety of electronic musical instruments, computers and other related devices. As such, a MIDI input jack 34a, MIDI output jack 34b and USB port 34c can be provided. Each of these devices can function to allow the device to perform wired communication utilizing the Musical instrument digital interface standard. The use and operation of the switched relays and the MIDI controller are also described in U.S. Patent Publication No. 2005/0056142, the contents of which are incorporated herein by reference.

The communication unit 35 can include any number of devices capable of communicating with a smartphone or other externally located processor enabled device. In one preferred embodiment, the communication unit can include a wireless communication module that consists of a Bluetooth transceiver providing direct wireless communication with a smartphone running the looper App 50. However, any number of other known transmission and reception mechanisms and/or communication protocols can also be utilized herein, several nonlimiting examples include unique radio frequency transmitter and receivers, Z-wave, and/or infrared (IR), for example. Alternatively or in addition to the above, the communication unit can include or comprise any type of network adapter capable of communicating over a network 120 such as WI-FI, LAN, WAN, a cellular communications network, and/or the internet via an internet service provider.

The I/O Processing module 36 can include one or more sub processors and/or a plurality of input/output units that function to accept user inputs to provide instructions to the processor. In one embodiment, each of the resilient push buttons 20a-20z can individually or cumulatively initiate various programmatic functions of the device. Several non-limiting examples of functionality which can be performed by the input/output unit includes the ability to switch the device between an ON and OFF operating state, activate or deactivate a particular sound loop, and/or to pair the communication unit 35 with a smartphone or other such device. In this regard, the processing module 36 can also interface with the display unit 37 to send and receive information and instructions.

The display unit 37 can include virtually any type of known device capable of presenting information in a digital format to a user via a screen. Several nonlimiting examples include LCD displays, plasma, LED displays, electro-luminescent displays and the like. Additionally, the display unit 37 can also include or comprise a Graphic User Interface (GUI) capable of performing two way communication with a device user.

The power unit 38 can function to provide suitable power to each device component. To this end, the power unit can include any number of components such as an A/C electrical power transformer and cord 38a capable of allowing the device to be powered from a standard electrical outlet.

Figure 4:
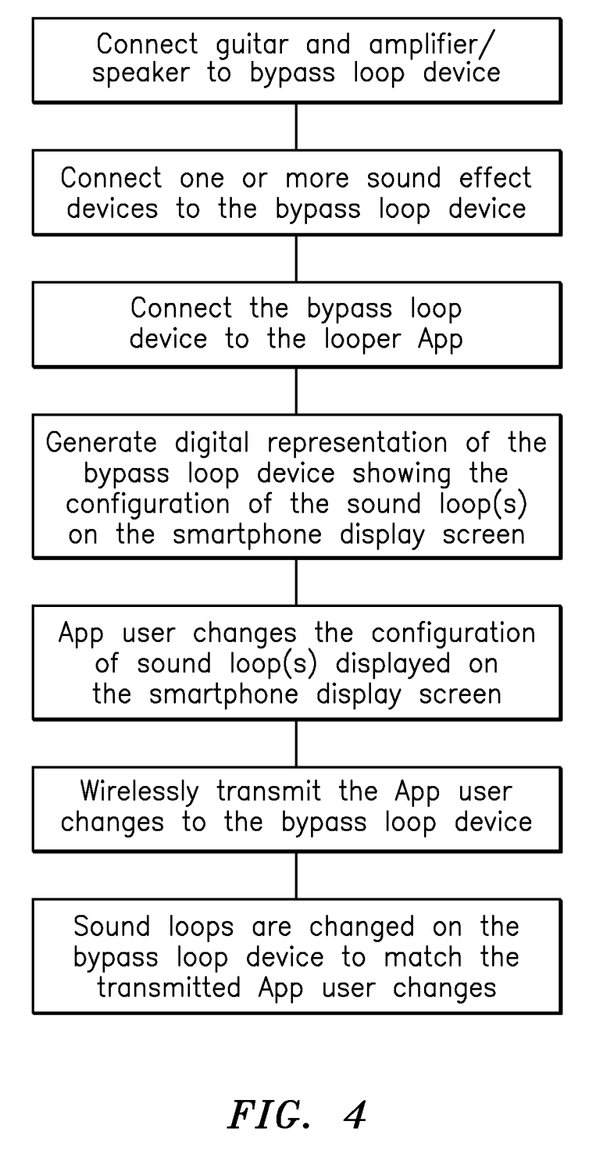
FIG. 4 is a schematic diagram of the bypass loop system in operation, in accordance with one embodiment of the invention.

In operation, and as depicted schematically in FIG. 4, the audio input and audio output jacks can be connected to a musical instrument and amplifier, respectively. Next, one or more sound effect devices can be connected to the device connectors 15. At this time, a user can program individual settings via the display and/or buttons, or can select from any number of pre-stored configurations which can be retrieved from the device memory. In this regard, the lights 21 and/or display 37 can provide visual guidance to the user of which presets and/or individual sound loops are active at any time.

As described herein, pre-store configurations or presets can include any number of distinct combination of active and inactive sound loops. Each of these presets can be stored within the device memory 32 and/or in the smartphone memory for transmission to the device via the wireless controller.

Figure 5:
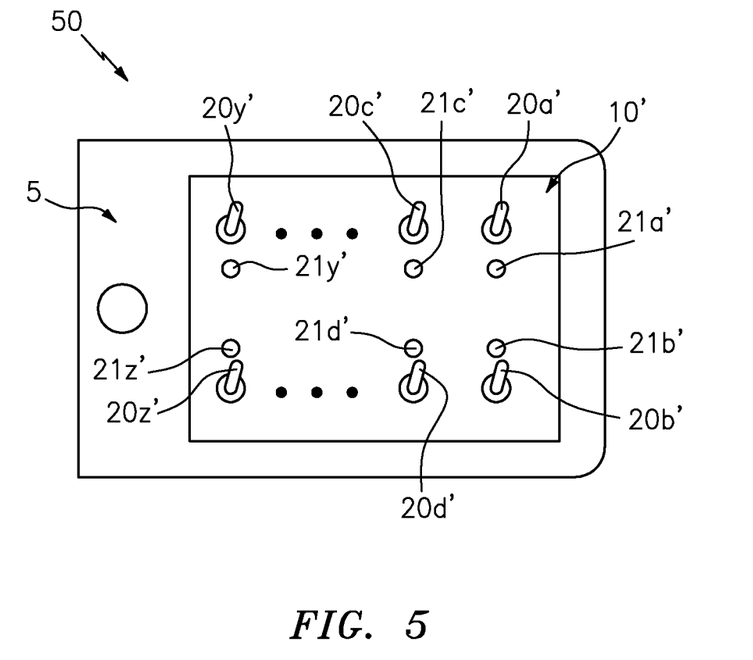
FIG. 5 illustrates an exemplary display screen which can be generated by the looper App, in accordance with one embodiment of the invention.

As shown in FIG. 5, once a smartphone 5 running the App 50 has been paired with the bypass loop device 10, the processor can direct the communication unit 35 to send and receive an operating status with the smartphone app 50. At this time, the App 50 can generate a digital representation of the bypass loop device 10' on the smartphone screen. As shown, the digital representation can include virtual switches 20a'-20z' that correspond to actual switches 20a-20z, along with visual indicators 21a'-21z' that correspond to lights 21a-21z, respectively.

Although not illustrated, the smartphone App can also show any additional physical features that may be present on the bypass loop device 10, such as digital representations of additional lights showing which stored preset is active, and the like. As such, the bypass loop device 10 and App 50 can exchange any and all information pertaining to the operating status and/or operating instructions of the device 10, including the sound loops, the audio input, the audio output, the communication unit and/or the MIDI unit, for example, and any additional functionality included in the device 10 but not illustrated.

To this end, the communication unit 35 can report the current operating status of the bypass loop device 10, i.e., which sound loops are active and/or which pre-stored configuration(s) are active at any given time to the App 50. The communication unit 35 can also immediately update the digital representation of the loop device that is displayed on the smartphone, thereby providing a real time representation of the device settings to the App user at all times.

In addition to the above, the two way communication between the App 50 and the bypass loop device 10 further allows the App 50 to remotely change the settings of the bypass loop device. In one embodiment, changes can be made to the bypass loop device 10 when the App user engages the virtual switches 20a'-20z' and/or selects from a list of pre-stored sound loop configurations stored on the smartphone memory and/or the internet, for example. When such selections are made on the App, the smartphone can transmit the change request(s) to the communication unit 35 of the bypass loop device 10, at which time the processor can implement the changes. Moreover, by utilizing the storage and/or internet capability of the smartphone running the looper App 50, a user can store and/or download an unlimited number of different sound loop configurations which can be immediately transmitted to the device 10 and implemented by the device processor.

Although described above as including a digital 1 for 1 representation of the bypass loop device on the smartphone, the invention is not so limiting. As such, any number of different presentation screens can be provided for allowing the App user to communicate with the bypass loop device in a wireless manner, in order to achieve the inventive concepts disclosed herein.

Accordingly, the above described remotely operably bypass loop system provides users with the ability to quickly and easily change the sound loops and other settings of a bypass loop device via a smartphone App, thereby eliminating the need to physically access the same during a performance.

As described herein, one or more elements of the bypass loop device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's smartphone, partly on the user's smartphone, as a stand-alone software package, partly on the user's smartphone and partly on a remote computer or entirely on the remote computer or server. In the latter scenario, the remote computer may be connected to the user's smartphone through any type of network, including a cellular network connection, a local area network (LAN) or a wide area network (WAN), or the connection may be made to an external computer (for example, through the Internet using an Internet Service Provider).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A bypass loop system, comprising:
   a bypass loop device that includes:
   a main body that is constructed from a rigid material,
   an audio input jack that is configured to engage a musical instrument,
   an audio output jack that is configured to transmit audio signals to at least one of an amplifier and a speaker,
   a plurality of sound effect connectors, that are configured to engage a plurality of sound effect devices,
   a plurality of control switches that are configured to selectively engage the plurality of sound effect connectors,
   a plurality of lighted elements that are selectively activated via the plurality of control switches, and
   a communication unit that is configured to perform wireless communication; and
   a bypass looper application that includes machine readable instructions for execution on a smartphone device having a processor, a memory, internet connectivity, and a display screen, said application functioning to
   generate a digital representation of the bypass loop device, and
   communicate wirelessly with the communication unit of the bypass loop device.

2. The system of claim 1, further comprising:
a plurality of internal relays that are disposed within the main body, each of the plurality of relays being in communication with one of the plurality of control switches and one of the sound effect connectors to form a plurality of sound loops.

3. The system of claim 2, wherein the digital representation of the bypass loop device further includes a plurality of virtual control switches that correspond to each of the plurality of control switches, and
a plurality of visual indicators that correspond to each of the plurality of lighted elements.

4. The system of claim 3, wherein upon selection of a virtual control switch, the looper application sends a change request to the bypass loop device, and upon receiving the change request, the bypass loop device engages the corresponding control switch.

5. The system of claim 4, wherein engagement of the corresponding control switch transitions an associated sound loop between an on and off operating state.

6. The system of claim 5, wherein the communication unit functions to transmit an operating status of each sound loop to the looper application, and
the looper application includes functionality for changing the digital representation of the bypass loop device to conform to the operating status.

7. The system of claim 1, wherein the bypass loop device further includes a controller, comprising:
at least one memory;
a MIDI controller;
an input/output unit;
a power source; and
one or more processors that are in communication with, and controls an operation of each of the plurality of control switches, the plurality of lighted elements, the power source, the input/output unit, the communication unit, the MIDI controller, and the memory.

8. The system of claim 7, wherein the memory is configured to store a plurality of preset operating states.

9. The system of claim 1, wherein the communication unit includes a Bluetooth transceiver.

10. The system of claim 1, wherein each of the plurality of sound effect connectors includes both an input jack and an output jack.

11. The system of claim 1, wherein each of the switches comprise metallic push button switches suitable for engagement by a human foot.

12. The system of claim 1, wherein the looper application further includes functionality for engaging the memory of the smartphone device to retrieve one or more preset operating states for transmission to the bypass loop device.

13. The system of claim 1, wherein the looper application further includes functionality for engaging the memory of the smartphone device to store one or more preset operating states that are received from the bypass loop device.

14. The system of claim 1, wherein the looper application further includes functionality for engaging the internet connectivity of the smartphone device to retrieve one or more preset operating states for transmission to the bypass loop device.

\* \* \* \* \*